United States Patent Office 3,180,508 Patented Apr. 27, 1965

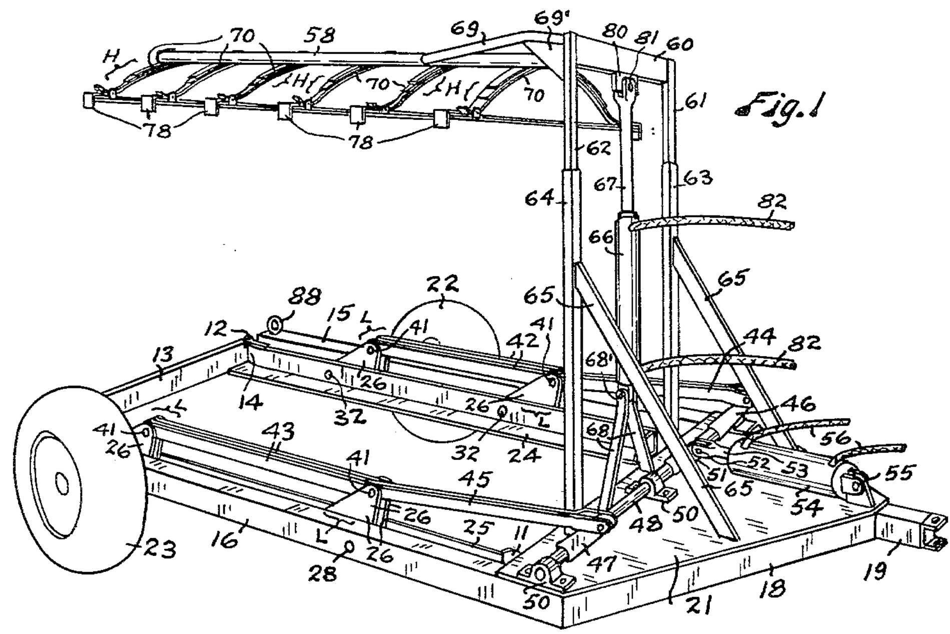
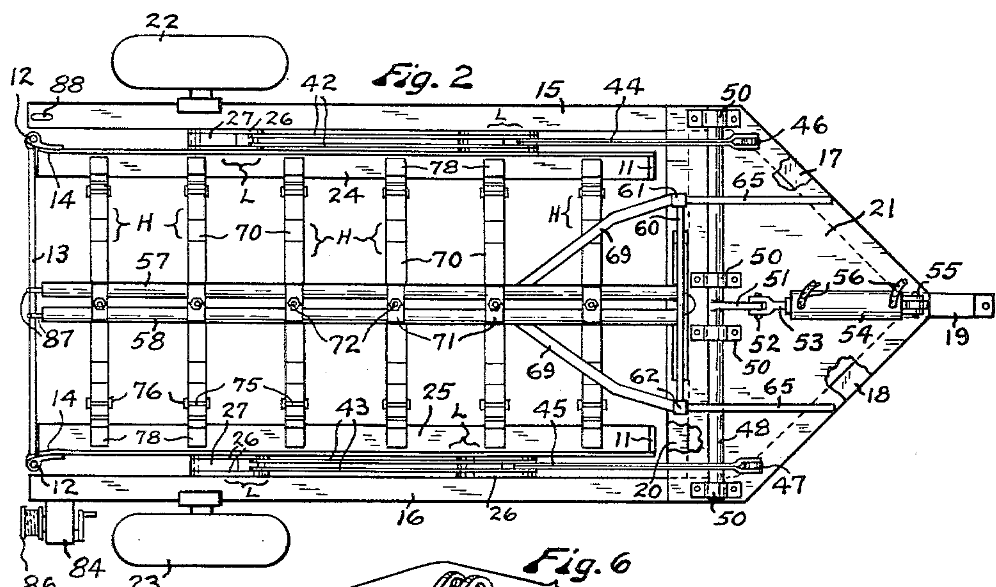
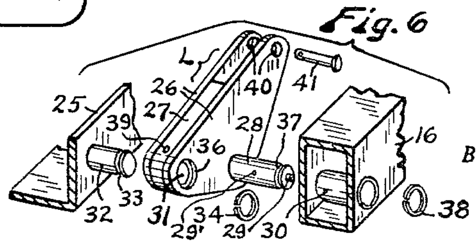
INVENTORS.
FRED A. HARVILL
AUDIE L. HARVILL
BY Gilbright Arnold
ATTORNEY

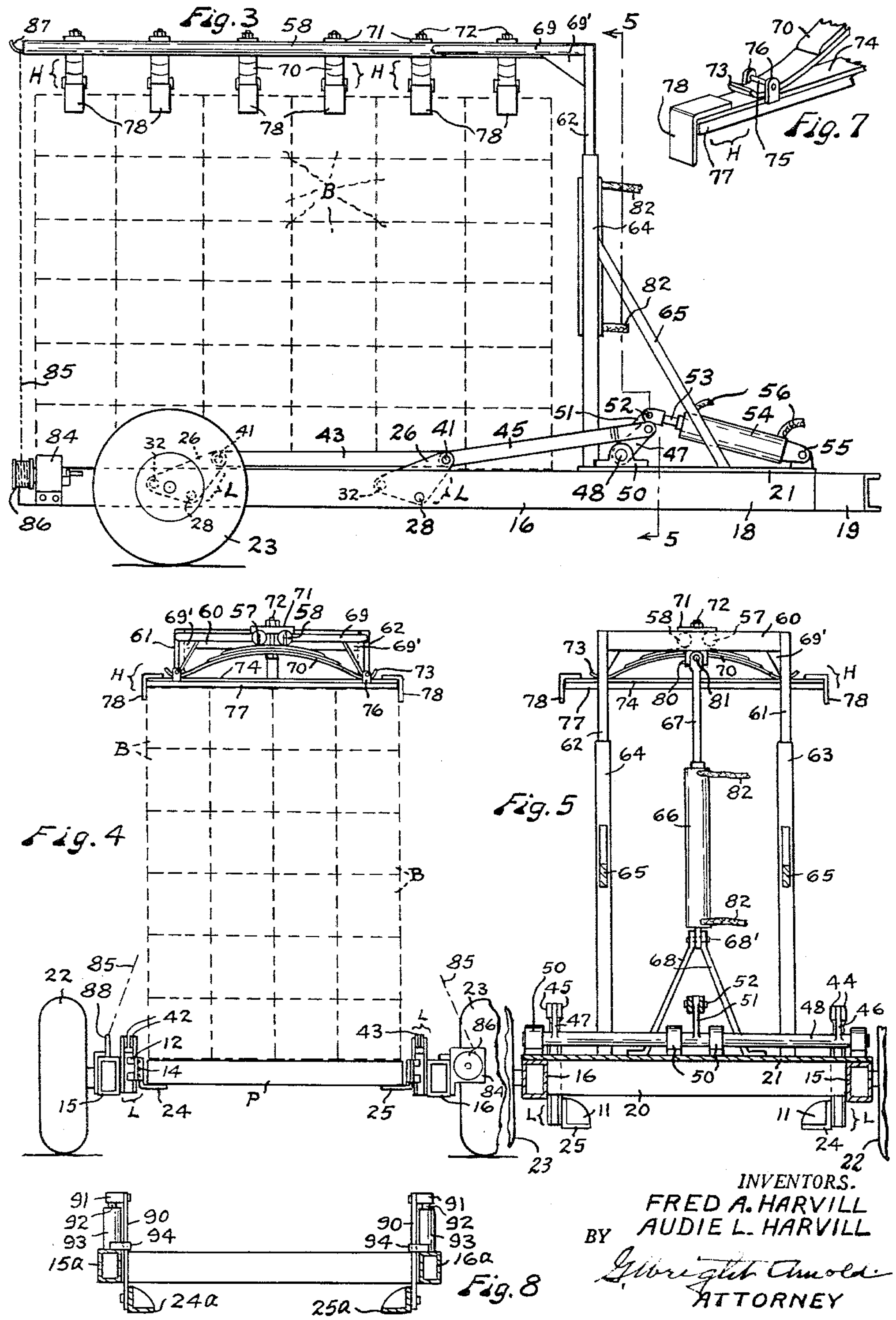
INVENTORS.
FRED A. HARVILL
AUDIE L. HARVILL
BY
ATTORNEY

3,180,508

TRUCK OR TRAILER FOR MOVING FRUIT FROM THE ORCHARD TO THE PACKING STATION

Fred A. Harvill and Audie L. Harvill, both of Rte. 2, Whitstrand, Wash.

Filed Jan. 4, 1962, Ser. No. 164,369
1 Claim. (Cl. 214—392)

Our invention relates to a truck or trailer for moving fruit from the orchard to the packing station.

More particularly, our invention relates to a truck which is adapted to be loaded with ease manually in the orchard and to have the bottom frame lifted for lift truck operation in unloading at the packing station.

Presently much time and handling expense is involved in moving fruit from the orchard to the packing station. In large part, the work is done by individual handling of loaded boxes. Often rough ground must be traversed between the picking up of the fruit in the orchard and the packing station so that great care must be employed to prevent spilling and injury of the fruit.

Briefly stated and therefore incompletely, our invention comprises a truck with a loading frame which may be lowered while loading in the orchard to lessen manual strain and then raised to provide road clearance over rough ground en route to the packing station. The truck is provided with a frame which is adapted to receive pallets on which may be placed boxes of fruit when the loading frame is lowered to a position close to the ground to minimize the manual lifting of the boxes. Then, when loaded with the desired number of boxes a top holding frame is lowered to resiliently engage without injury to the fruit and hold firmly in place the multiple tiers of boxes. This top holding frame is then locked in place and its resiliently engaging of the top boxes prevents injury to the fruit while holding the tiers in place on the pallets. To provide for the truck clearing the ground, the load frame is power lifted to traveling position for the trip to the packing station. Also, by elevating the load carrying frame provision is made for the pallets at the packing station to have the arms of the lift trucks to engage the pallets by sliding underneath the load frame and take off the pallets with its tier of boxes. This arrangement makes possible greatly reducing the time of moving the fruit from the orchard to the packing station. This saving of time has been established by actual tests.

The above mentioned general objects and purposes of our invention, together with others inherent in the same are attained by the mechanism and invention illustrated in the following drawings, throughout which like reference numerals indicate like parts:

FIGURE 1 is a perspective view of a trailer embodying my invention.

FIG. 2 is a top plan view of said trailer.

FIG. 3 is a side elevation of said trailer, showing by dash lines a load of boxes on the same.

FIG. 4 is a rear elevation of the trailer showing the boxes by dash lines.

FIG. 5 is a view partly in front elevation and partly in section taken substantially on broken line 5—5 of FIG. 3, the showing of the boxes being omitted and the box supporting shoes being shown in a lowered position.

FIG. 6 is a fragmentary exploded perspective view showing part of the trailer frame, part of a load carrying member and a mounting member of lever type by which the load carrying member is mounted for vertical movement on the frame.

FIG. 7 is a fragmentary perspective view showing an end portion of one of the spring pressed box-hold-down members embodied in the invention.

FIG. 8 is a view partly in section and partly in elevation showing means of modified construction, including fluid pressure operated devices for vertically adjustably mounting the box supporting members on the trailer frame.

Our trailer vehicle or truck comprises base frame including two spaced apart parallel side bars 15 and 16 which at their front ends may be welded or otherwise rigidly secured to two convergently inclined end bars 17 and 18 respectively. Preferably, the end bars 17 and 18 are inclined at an angle in the order of forty-five degrees relative to the side bars 15 and 16 and the forward ends of said end bars 17 and 18 are welded to a short tongue member 19. The forward end portions of the side bars 15 and 16 are further connected with each other by a cross bar 20 shown in FIG. 5 and a fragment of which is shown in FIG. 2. The rear end of the short tongue 19 is rigidly secured to the cross bar 20. A deck plate 21 of fairly strong and heavy metal is disposed on the cross bar 20 and end bars 17 and 18 and forward end portions of the side bars 15 and 16 and preferably welded thereto.

Preferably the side bars 15 and 16 and end bars 17 and 18 are tubular and of rectangular cross section and they cooperate with the cross bar 20 and tongue 19 on deck plate 21 to form a strong and substantial base frame capable of carrying a heavy load. The part of this frame to the rear of the cross bar 20 is free of all cross brackets to provide load clearance as hereinafter explained. The side bars 15 and 16 are sufficiently strong so that, under normal conditions of use, they will remain parallel and will not be bent toward each other or away from each other.

The rear end portions of the main frame members 15 and 16 are supported by wheels 22 and 23 respectively which preferably are positioned close to the outer sides of said main frame members. The forward end of the frame formed by parts 15 to 20 inclusive can be supported on suitable blocking when the trailer vehicle is not being moved and is supported by a tractor or like power vehicle when said trailer is being moved.

Two angle bars 24 and 25, herein termed load carrying members are disposed parallel with and alongside of the respective main frame members 15 and 16. Each load carrying member has one flange positioned vertically and close to the adjacent main frame member 15 or 16 and the other flange inwardly directed and positioned horizontally for load carrying purposes. The load carrying members 24 and 25 are adapted to receive and support platens P, FIG. 4, whereon fruit filled boxes B, shown by dash lines are stacked.

Preferably the rear ends of the upright flanges of the load carrying members 24 and 25 are outwardly curved as indicated by 14 in FIG. 2, to facilitate loading stacks of boxes B from the rear onto said members 24 and 25. Also preferably a box holding bar 13 is removably or swingingly connected with the rear ends of the load carrying members 24 and 25. By way of illustration, the bar 13 is herein shown as connected with the rear ends of the load carrying members 24 and 25 by removable pin hinges 12 so that it can either be completely removed or can be swingingly moved to one side to facilitate loading. When bar 13 is connected across the rear ends of members 24 and 25, as shown in FIG. 2, it prevents rearward movement of the platens P and also serves as a tie member which helps to prevent spreading of the rear portions of the load carrying members 24 and 25. This in turn helps to prevent spreading of frame members 15 and 16. The bar 13 is omitted in FIG. 4. Also preferably the front ends of the load carrying members 24 and 25 are provided with rigidly attached stop plates 11, FIGS. 1, 2 and 5 which limit forward movement of the platens P and load supported by said members 24 and 25.

Each load carrying member 24 and 25 is supported for vertical movement from the adjacent main frame member 15 or 16 by preferably two spaced apart levers indicated generally by L. One of said levers L and fragments of the main frame member 16 and load carrying frame member 25 are shown in FIG. 6. Said levers L and the mounting parts therefor are all of duplicate construction except that they are made "right" and "left." A description of one of said levers L, as shown in FIG. 6, will apply equally well to the others. Each lever L comprises two spaced metal plates 26 of generally triangular shape having therebetween a filler spacer member 27 which is rigidly secured to the plates 26. A rigidly attached bearing pin 28, which serves as a fulcrum, protrudes sidewise from the lever L and is received within a transverse bearing tube 30 in the adjacent main frame member this being the frame member 16 in FIG. 6. The rear end of each lever L is provided with a transverse bearing tube 31 adapted to receive a rigid cylindrical bearing stud or part 32 which protrudes perpendicularly from the upright flange of the adjacent load carrying frame member 25. An annular ring-receiving groove 33 is provided in the bearing stud 32 close to the outer end thereof for the reception of a snap ring 34. The snap ring 34 is adapted to hold the frame member 25 and lever L in assembled relation. Preferably, the outer end of each bearing tube 31 has an annular counterbored recess 36 deep enough and large enough to permit application and removal of a snap ring 34 relative to a bearing stud 32 although the end of said bearing stud does not protrude from the outer side of a lever plate 26 adjacent the main frame member 16.

Also preferably an annular groove 37 for the reception of a snap ring 38 is provided in the outer end portion of the bearing pin 28. The snap ring 38 holds the lever member L in closely assembled relation to the frame member.

Bearing pin 28 can be supplied with lubrication through a conventional grease fitting 29 and suitable perforations 29. An oil receiving perforation 39 in filler member 27 allows for lubrication of bearing stud 32. Provision is made for lubricating both the bearing pin 28 and the bearing stud 27.

The upper ends of the side plates 26 of each lever L are provided with suitable holes 40 for the reception of a pin 41. The upper ends of the two levers L on the left side of the trailer are connected with each other by preferably two side by side spaced apart limbs 42 and the upper ends of the two levers L on the right side of the trailer are connected with each other by two similar links 43. Two other links 44 and 45 positioned respectively on the left and right side of the trailer connect the upper ends of the two foremost levers L with two lever arms 46 and 47 which are rigidly attached to a cross shaft 48. The cross shaft 48 is mounted for oscillation in bearings 50 on the deck plate 21. A medially positioned third lever arm 51 is rigidly attached to the shaft 48 and is connected by a pivot 52 with the piston rod 53 of a hydraulic cylinder 54. The end of the cylinder 54 remote from the piston rod 53 is supported from the deck plate 21 in the usual manner by pivot and lug means 55. When the piston rod 53 is at or near the limit of its movement to the right as shown in FIGS. 1, 2 and 3 the load carrying frame members 24 and 25 will be supported in a raised position at approximately the same elevation as the two main side frame members 15 and 16, as shown in FIG. 4. This is the normal position of the load carrying members 24 and 25 when the trailer is being moved. Movement of the piston rod 53 to the left, FIGS. 1, 2 and 3, will simultaneously angularly move all of the levers L anti-clockwise and will lower the load carrying members 24 and 25 into a loading position, as shown in FIG. 5. Suitable hoses 56 are connected with the cylinder 54 and preferably extend to a controlled source of supply of liquid under pressure on the vehicle by which the trailer is towed.

FIGS. 3 and 4 illustrate one manner of using our trailer for transporting a load formed of boxes B of fruit. In these figures the boxes B are shown diagrammatically by dash lines. The boxes B are usually handled by stacking them on pallets P, FIG. 4. It is common practice to use pallets P four feet square for this purpose. Seventy-two fruit boxes B of a commonly used standard size can be stacked on a pallet four feet square by placing twelve boxes in each tier and making the load six tiers high. The load carrying members 24 and 25 shown in the drawings are long enough to receive and support two pallets. Obviously the length of these load carrying members can be varied to adapt them to receive one or more pallets but preferably not in excess of four pallets. We find it practical to construct the trailer long enough to receive and carry four pallets P. When the length of our trailer is thus increased we preferably provide the same with two longitudinally spaced apart sets of wheels similar to wheels 22 and 23.

The box holding means comprises upright supporting, and actuating devices carried by the front end portion of the vehicle frame and vertically movable resilient box holding or hold-down apparatus carried by said upright supporting devices. The box holding apparatus comprises two parallel horizontal frame bars 47 and 48, which can be metal tubes of either round or rectangular cross section. The bars 57 and 58 carry spaced apart transverse resilient box holding members H of a form hereinafter described. The forward end portions of the frame bars 57 and 58 are welded or otherwise rigidly secured to the opposite end portions of the cross head 60 and extend downwardly therefrom and fit telescopically within two upwardly extending guide tubes 63 and 64 respectively. The lower ends of the guide tubes 63 and 64 rest on and are rigidly secured to the deck plate 21. Suitable inclined brace members 65 have their upper ends rigidly secured to the guide tubes 63 and 64 and their lower ends rigidly secured to the deck plate 21 for the purpose of stabilizing and supporting the guide tubes 63 and 64. A hydraulic cylinder 66 having a longitudinally movable piston rod 67 therein is interposed between the crosshead 60 and a bracket 68 which is attached to the deck plate 21. The lower end of the cylinder 66 is connected with the bracket 68 by a pivot 68[1] and the upper end of the piston rod 67 is connected by a bracket 80 and pivot member 81 with the crosshead 60 midway between the two ends of said crosshead. Suitable hoses 82 connect the cylinder 66 with fluid pressure supply means on the vehicle by which this trailer is towed.

Angle braces 69 extend between the top end portions of the respective upright arms 61 and 62 and the frame bars 57 and 58 to stabilize the box holding frame structure in horizontal directions and preferably by a brace plate 69[1] is provided between each upright arm 61 and 62 and the attached angle brace 69 in the interest of vertical stability.

The overhead frame bars 57 and 58 carry a plurality of the resilient box holding devices H which are of duplicate construction. These box holding devices H extend crosswise of the bars 57 and 58 and are spaced apart longitudinally of said bars and are adapted to resiliently engage with boxes B of the top tier of the load. The drawings show one said box holding device for each transverse row of boxes but obviously this arrangement can be varied. The following description of one box holding device H applies equally well to the others.

Each box holding device H comprises a multiple leaf spring 70 extending across the two frame bars 57 and 58 and having its medial portion secured to said bars 57 and 58 a shackle bar 71 and a bolt 72. Each end portion of the lowermost leaf of each spring 70 rests on a straight flat metal bar 74 and passes under a cross pin 75, FIG. 7. Each cross pin 75 is supported by two lugs 76 which are rigid with and extend upwardly from the bar 74. Preferably each end portion of the lowermost leaf of each spring 70 has an upwardly curved part 73 to prevent disengagement with the adjacent cross pin 75. A flat strip 77, preferably of wood, is secured to the lower side of the metal bar 74 and is adapted to contact the boxes B. Obviously box holding strips or frames can be interposed between the tops of the boxes and the holding members H is desired. A box engaging member 78 is rigid with each end of each metal bar 74 and extends downwardly therefrom for engagement with the outer end of an uppermost box of the load. The box engaging members 78 can conveniently be of L or angle shape and be welded to the end portions of the metal bars 74. Preferably means are provided for exerting a downward pull on the outer ends of the bars 57 and 58 to insure an evenly distributed downward pressure of all of the box holding devices H on the boxes. This means is useful as an added safety feature, when hauling over rough terrain or making long hauls. For this purpose we preferably secure small hand operated winch 84 to the rear end portion of the one side frame member such as the member 16. A pliable cable 85 is wound on a drum 86 on the winch 84. This cable can be passed over hooks 87 on the ends of the box holding bars 57 and 58 and secured to a ring or eye member 88 in the rear end of the other frame member 15. It can then be tensioned by operation of the winch and the desired tension maintained. The winch is of conventional construction and is not herein disclosed in detail.

FIG. 8 shows hydraulic means of modified construction for supporting and vertically moving two load carrying members 24*a* and 25*a* which are similar to the load carrying members 24 and 25. The load carrying members 24*a* and 25*a* are supported by links 90 which are connected between said members 24*a* and 25*a* and fittings 91 on the upper end of the piston rods 92 of upright hydraulic cylinders 93. The cylinders 93 are supported by and rigidly secured to side frame bars 15*a* and 16*a* which are similar to the main frame bars 15 and 16. A guide member 94 is preferably provided for each link 90 to prevent swinging movement of the same. At least two of the hydraulic assemblies shown in FIG. 8 are connected with each load carrying member 24*a* and 25*a* and suitable fluid pressure supply and control devices are connected with all of the hydraulic cylinders 93 for sychronously operating said cylinders.

When this trailer is to be loaded the load carrying members 24 and 25 are preferably lowered and the overhead box holding assembly raised. The loading can be carried out in different ways. For instance, the pallets P can be placed on the load carrying members 24 and 25 and the boxes brought to the trailer and stacked on the pallets; or if the ground or surface over which the loading operation is being carried out admits of the use of lift trucks then the pallets can be loaded with boxes and these box-loaded pallets can be picked up with lift trucks and placed on the trailer; or conceivably, pallets in an orchard or other location which have had stacks of boxes placed on them can be loaded onto this trailer by lowering the load supporting members 24 and 25 and then properly aligning and backing the trailer until it is correctly positioned with the horizontal flanges of the lowered load supporting members 24 and 25 under the edges of the box-loaded pallet so that the loaded pallet can be picked up by lifting the members 24 and 25.

With the rear bar 13 removed or swingingly moved to an out of the way position there is no obstruction to loading from the rear. The trailer wheels and the supporting end operating devices for the load carrying members 24 and 25 are low and do not objectionably interfere with side loading of the boxes.

Before a loaded trailer is moved the hydraulic cylinders 54 and 66 are successively actuated to first raise and hold the members 24 and 25 and their load in the elevated position shown in FIG. 4 and to then lower and hold the overhead box holding or steadying assembly down on the top tier of boxes. All of the boxes will be securely clamped and held between the overhead box holding assembly and the load carrying members 24 and 25 and the trailer can be moved at reasonable speed across fairly rough ground without danger or damaging the fruit or losing any of the boxes off of the trailer. If circumstances permit, this overhead box securing or holding assembly may be omitted.

One method of unloading the trailer at its destination is to lift the overhead box holding assembly clear of the boxes and then either while the load carrying members 24 and 25 are in a raised or lowered position to remove the loaded platens with lift trucks. Another method of unloading is to insert suitable blocks or supports under the loaded platens which are resting on the raised load or otherwise move the trailer over suitable blocks or supports while the platens are still in a raised position and then lower the loaded platens onto the blocks or supports and withdraw the trailer leaving the loaded platens supported on the blocks ready to be picked up by lift trucks or for which disposition otherwise is arranged.

While there has been described an embodiment of the invention, it is appreciated that changes may be made in the parts and their organization without departing from the inventive concept thereof. It is desired not to be limited to the particular embodiment illustrated, but to cover all modifications and arrangements which would be apparent to one skilled in the art and that come within the scope of the appended claim.

We claim:

A vehicle for transporting stacks of boxes on pallets comprising two spaced parallel frame members; deck means rigidly securing the forward end portions of said frame members together, the space between the rear end portions of said frame members being unobstructed and open affording entrance between the rear ends of said frame members for loading purposes; two load carrying members of an L shaped cross section positioned adjacent the inner sides of the respective frame members and having inwardly directed horizontal flanges capable of receiving pallets whereon stacks of boxes are disposed; levers interconnecting each load carrying member with the adjacent frame member; a cross shaft mounted for oscillation on said deck means; hydraulic shaft oscillating means connected with said cross shaft; link and lever means connecting said cross shaft with said levers providing vertical adjustment of said load carrying members in response to oscillation of said shaft; upright rigid supports mounted on said deck means; a horizontal box holding assembly vertically adjustable carried by said upright rigid supports and positioned in opposed spaced relation above said load carrying members; and hydraulic cylinder and piston means connected with said box holding assembly operable in vertically adjusting said box holding assembly and holding the same in adjusted positions for securing the boxes in position.

References Cited by the Examiner

UNITED STATES PATENTS

| | | | |
|---|---|---|---|
| 2,281,012 | 4/42 | Sears | 214—654 |
| 2,684,165 | 7/54 | Hill | 214—654 |
| 2,822,944 | 2/58 | Blomgren | 214—390 |
| 2,897,989 | 8/59 | Hounsell | 214—390 |
| 2,926,804 | 3/60 | Fuhrmann et al. | 214—390 |
| 2,934,228 | 4/60 | Hillberg | 214—390 |

FOREIGN PATENTS

| | | |
|---|---|---|
| 766,292 | 1/57 | Great Britain. |
| 854,323 | 11/60 | Great Britain. |

HUGO O. SCHULZ, *Primary Examiner.*

GERALD M. FORLENZA, *Examiner.*